US008208972B2

(12) United States Patent
Krishnan et al.

(10) Patent No.: US 8,208,972 B2
(45) Date of Patent: *Jun. 26, 2012

(54) LOW POWER DUAL PROCESSOR ARCHITECTURE FOR MULTI MODE DEVICES

(75) Inventors: Ranganathan Krishnan, San Diego, CA (US); Albert S. Ludwin, San Diego, CA (US); William R. Gardner, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 325 days.

This patent is subject to a terminal disclaimer.

(21) Appl. No.: 11/946,901

(22) Filed: Nov. 29, 2007

(65) Prior Publication Data

US 2008/0072014 A1 Mar. 20, 2008

Related U.S. Application Data

(63) Continuation of application No. 10/229,507, filed on Aug. 27, 2002, now Pat. No. 7,450,963.

(51) Int. Cl.
*H04W 52/02* (2009.01)

(52) U.S. Cl. ............. 455/574; 455/557; 455/556.1; 455/343.1

(58) Field of Classification Search .................. None
See application file for complete search history.

(56) References Cited

U.S. PATENT DOCUMENTS

| | | | |
|---|---|---|---|
| 5,487,181 A | 1/1996 | Dailey et al. | |
| 5,870,680 A | 2/1999 | Guerlin et al. | |
| 5,925,092 A | 7/1999 | Swan et al. | |
| 6,731,958 B1 | 5/2004 | Shirai | |
| 6,816,925 B2 | 11/2004 | Watts, Jr. | |
| 6,941,538 B2 | 9/2005 | Hwang et al. | |
| 7,020,487 B2 | 3/2006 | Kimata | |
| 7,062,303 B2 | 6/2006 | Guterman | |
| 7,069,456 B2 | 6/2006 | Bormann et al. | |
| 7,401,163 B2 | 7/2008 | Nishimoto et al. | |
| 7,450,963 B2 | 11/2008 | Krishnan et al. | |
| 2002/0095609 A1 | 7/2002 | Tokunaga | |
| 2002/0173344 A1 | 11/2002 | Cupps et al. | |
| 2003/0017854 A1 | 1/2003 | Avitan | |

FOREIGN PATENT DOCUMENTS

| | | |
|---|---|---|
| CN | 1200855 | 12/1998 |
| JP | 11-215043 | 8/1999 |
| JP | 11341171 A | 12/1999 |
| JP | 2001256205 A | 9/2001 |
| JP | 2002-032158 | 1/2002 |
| JP | 2002033851 A | 1/2002 |
| JP | 2002215597 A | 8/2002 |
| WO | 0221290 | 3/2002 |
| WO | 02054212 | 7/2002 |
| WO | WO02061591 A1 | 8/2002 |

OTHER PUBLICATIONS

International Search Report PCT/US03/027182, International Search Authority US, Jan. 13, 2004.

(Continued)

*Primary Examiner* — Philip J Sobutka
(74) *Attorney, Agent, or Firm* — Nicholas J. Pauley; Peter M. Kamarchik; Jonathan T. Velasco

(57) ABSTRACT

A mobile computing device with multiple modes, for example, wireless communication and personal computing, has an application processor and a communication processor. In the computing mode, the application processor is the master processor. In the communication mode, the application processor is deenergized to conserve battery power, with the communication processor functioning as the master processor by accessing the device's peripheral bus using the memory interface of the communication processor.

16 Claims, 2 Drawing Sheets

OTHER PUBLICATIONS

International Preliminary Examination Report—PCT/US03/027182, IPEA/US—Dec. 10, 2004.

Supplementary European Search Report—EP03791963, Search Authority—The Hague—Apr. 2, 2009.

European Search Report—EP11166665, Search Authority—The Hague Patent Office, Jul. 28, 2011.

LOW POWER DUAL PROCESSOR ARCHITECTURE FOR MULTI MODE DEVICES

CROSS-REFERENCE TO RELATED APPLICATIONS

The present application is a continuation of application Ser. No. 10/229,507, filed Aug. 27, 2002 now U.S. Pat. No. 7,450,963.

BACKGROUND

1. Field

The present invention relates generally to multi mode devices such as wireless telephones that can also undertake ancillary computer functions.

2. Background

Multi mode mobile computing devices have been proposed which have multiple capabilities. For example, mobile telephones might be expected to undertake personal computing tasks now undertaken by notebook computers, in addition to their communication functions.

As recognized herein, multiple processors might be required to support multiple modes of operation. As also recognized herein, using the same internal operation independent of the operational mode means that a main processor typically functions as a master device that controls peripheral devices and that treats the other device processors (e.g., a telephone modem processor) as peripherals. Such a design requires that the main processor be active in all modes, including, e.g., the main processor needs to be active in the telephone mode, in which the modem processor is active, simply to provide the modem processor access to device hardware (e.g., a data display, non volatile storage, audio input/output) that is controlled by the main processor. In other words the main processor is here simply mediating on behalf of the modem processor, because the hardware architecture does not allow the modem processor direct access to some of the hardware resources in the device.

As understood herein, it would be advantageous to minimize when possible, the use of hardware intermediaries (such as the main processor in the example above) to allow power efficient execution of tasks, to conserve the battery. Moreover by use of methods described in this invention it may be possible to power off processors that don't need to serve such intermediary role further extending device battery life. Furthermore, requiring a single main processor to always function as a device master means that software and software changes that might apply only to a modem processor must be coordinated or otherwise integrated with the main processor as well, complicating software management. In particular the large base of software presently available for cellular phone type devices, which functions on the modem processor cannot be used unchanged in a device in which the modem processor is a peripheral to a main application processor. The present invention can allow the reuse of this large base legacy of application software by architecting the hardware so that it appears to the legacy software as it would in current single processor devices.

SUMMARY

A multi mode mobile device includes a housing holding a battery and a communication processor that may be embodied in a module configured to facilitate wireless communication using the device. The communication processor module is supported on the housing and is powered by the battery. An application processor that may be embodied in a module is configured to execute applications is also supported on the housing and powered by the battery. A module in this description means a collection of hardware, assembled of discrete components or within an integrated circuit package, that performs a function through coordinated use of its hardware components. In particular a communication processor module consists of a communications processor core in addition to other hardware resources that function as peripherals of the communications processor (for example Qualcomm's MSM 3300, 5100, 5500 which an ARM processor core are in the current view communications processor modules). Similarly in the current view an application processor module consists of an application processor core together with assisting hardware (for example Qualcomm's MSP 1000 or IBM's 405GP which have ARM and PowerPC processor cores are examples of application processor modules). In accordance with this aspect, the device has a communication mode and a computing mode, and when the device is in the communication mode, a core of the application processor is not energized. The application processor core is energized, however, when the device is in the computing mode.

Preferably, the communication processor module is associated with a memory bus that communicates with one or more memory devices and the application processor module is associated with a processor local bus (PLB). The preferred memory bus communicates with the PLB through hardware interfaces between the communication processor module and the application processor module. More specifically, the preferred memory bus communicates with a PLB bridge processor to facilitate the communication processor functioning as a master of the PLB. The communication processor can thereby access peripheral hardware associated with the PLB.

In another aspect, a multi mode mobile device includes a housing holding a battery and a communication processor configured to facilitate wireless communication using the device. The communication processor is supported on the housing and is powered by the battery. An application processor is configured to execute applications, and the application processor is supported on the housing and powered by the battery. The device has at least a communication mode and a computing mode, and when the device is in the communication mode, the communication processor functions as a master processor.

In still another aspect, a method for effecting mobile computing includes supporting an application processor and a communication processor in a housing. The method also includes selectively establishing one of the processors as a master processor based on a mode of operation.

The details of the present invention, both as to its structure and operation, can best be understood in reference to the accompanying drawings, in which like reference numerals refer to like parts, and in which:

While the description of the invention is presented in the context of distinct communication and application processor modules, it is recognized that this is only done for clarity of exposition. In particular it is envisaged that the communication and application processor modules could be realized on the same integrated circuit module, whether this be through a multi-chip-module packaging technique or through the design of the entire circuit as a single chip with the both (application and communications) processor cores on it.

DETAILED DESCRIPTION

Figure 1:
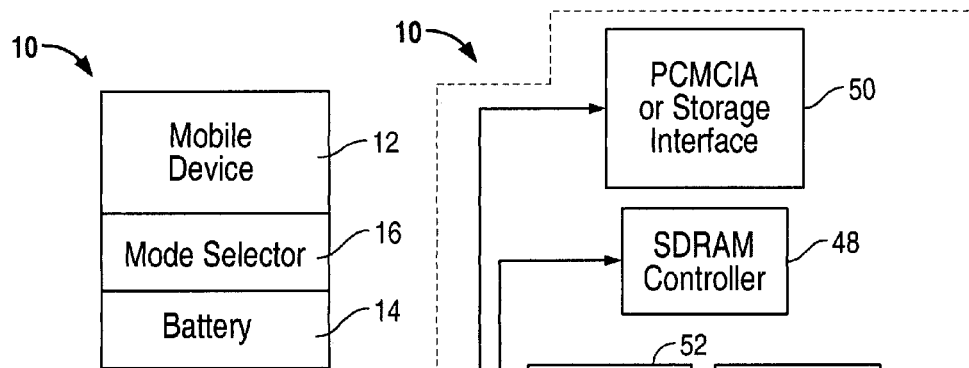
FIG. 1 is schematic diagram of a preferred non-limiting multi mode mobile computing device.

Referring initially to FIG. 1, a mobile multi mode computing device is shown, generally designated 10. In an exemplary non-limiting embodiment, the device 10 can be used to undertake wireless voice and/or data communication as well as personal computing application-based functions, such as but not limited to word processing. In any case, the device 10 includes a preferably lightweight portable housing 12 that holds the components discussed herein. A battery 14 can be engaged with the housing 12 to provide a source of power to the components disclosed below. The battery 14 preferably is rechargeable in accordance with portable computing principles known in the art, but when the device 10 is not connected to an electrical outlet, the battery 14 is the sole source of power to the components of the device 10.

A mode selector 16 can be provided on the housing 12. The mode selector 16 can be a user-manipulable input device to select the operational mode of the device 10, e.g., communication or computing. The mode selector 16 can be implemented in any number of ways, e.g., it can be a switch, or a portion of a touchscreen display that is used in conjunction with appropriate software to select the mode, or other equivalent input structure. Or, the mode selector 16 can be automatically implemented by software responsive to the user's activities, e.g., if the user starts to dial a number the mode selector can be software that automatically configures the device 10 in the communication mode.

Figure 2:
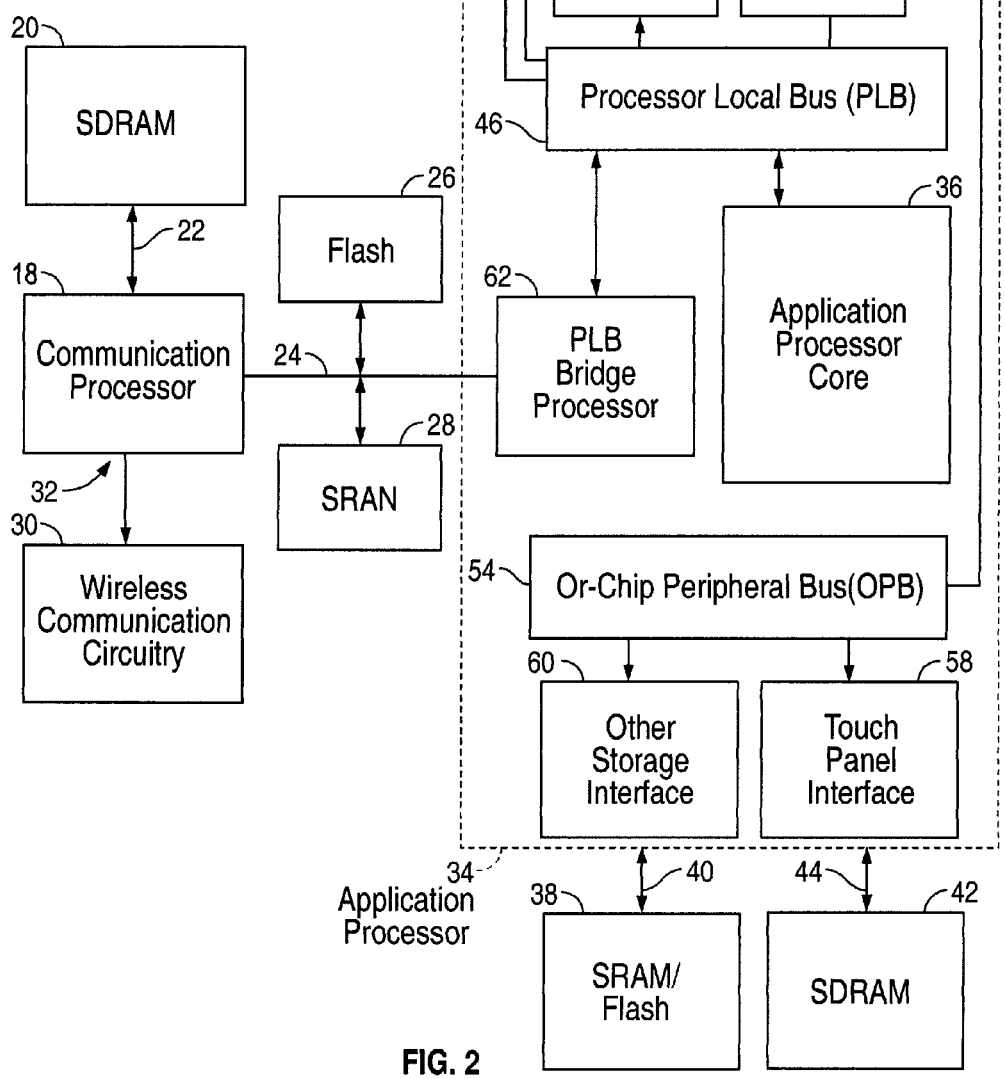
FIG. 2 is a block diagram of a preferred non-limiting implementation of the present multi mode mobile device architecture.

Now referring to FIG. 2, the device 10 includes a communication processor 18, preferably a type of processor referred to as a mobile system modem (MSM) that can access synchronous dynamic random access memory (SDRAM) 20 over, e.g., a 16/32 bit bus 22 and that can be implemented in a communication processor module. Also, the communication processor 18 can access, using, for instance, a 16 bit memory interface bus 24, MSM flash memory 26 and MSM static random access memory (SRAM) 28. Communication-related applications, such as the present assignee's "BREW" applications, can be stored in one or more of the memories 20, 26, 28 for execution thereof by the communication processor 18.

As also shown in FIG. 2, the communication processor 18 accesses wireless communication circuitry 30 to effect wireless communication in accordance with means known in the art. In other words, the communication processor 18, associated memories 20, 26, and 28, and circuitry 30 establish a wireless voice and/or data communication portion, generally designated 32.

In one non-limiting embodiment, the communication portion 32, also referred to as a "mobile station ("MS"), is a mobile telephone-type device made by Kyocera, Samsung, or other manufacturer that uses Code Division Multiple Access (CDMA) principles and CDMA over-the-air (OTA) communication air interface protocols such as defined in but not limited to IS-95A, IS-95B, WCDMA, IS-2000, and others to communicate with wireless infrastructure, although the present invention applies to any wireless communication device.

For instance, the wireless communication systems to which the present invention can apply, in amplification to those noted above, include GSM, Personal Communications Service (PCS) and cellular systems, such as Analog Advanced Mobile Phone System (AMPS) and the following digital systems: CDMA, Time Division Multiple Access (TDMA), and hybrid systems that use both TDMA and CDMA technologies. A CDMA cellular system is described in the Telecommunications Industry Association/Electronic Industries Association (TIA/EIA) Standard IS-95. Combined AMPS and CDMA systems are described in TIA/EIA Standard IS-98. Other communications systems are described in the International Mobile Telecommunications System 2000/Universal Mobile Telecommunications Systems (IMT-2000/UM), standards covering what are referred to as wideband CDMA (WCDMA), cdma2000 (such as cdma2000 1x or 3x standards, for example) or TD-SCDMA.

Still referring to FIG. 2, a main processor 34 that can be embodied in a module holds an application processor core 36, which in one non-limiting illustrative embodiment can be an IBM 405 LP processor or equivalent. While FIG. 2 shows that the processors 18, 36 can be on separate chips from each other, it is to be appreciated that they can also be disposed on the same chip.

The application processor core 36 accesses one or more software applications that can be stored in various memories to execute the applications. For example, the application processor core 36 can access an SRAM/Flashmemory 38 over, e.g., a 16-bit memory bus 40, and it can also access an SDRAM memory 42 (where software applications typically will be preferentially stored) over a preferably 32-bit bus 44.

FIG. 2 also shows that the application processor core 36 accesses a processor local bus (PLB) 46. In one non-limiting embodiment, the PLB bus 46 can be a 64-bit bus. Various supporting devices and peripherals are accessed by the application processor core 36 using the PLB 46 in accordance with principles known in the art. For example, the PLB 46 (and, hence, application processor core 36) can be connected to a SDRAM controller 48 for controlling the SDRAM memory 42. Also, the PLB 46 can communicate with a personal computer memory card interface architecture (PCMCIA) interface or other storage interface 50. Moreover, the PLB 46 (and, hence, application processor core 36) can be connected to a liquid crystal display (LCD) controller 52, which drives an LCD display that can be provided on the housing of the device 10.

In addition to the components discussed above, the application processor 34 which bears the application processor core 36 can also hold an on-chip peripheral bus (OPB) 54 which in one non-limiting embodiment can be a 32 bit bus. The OPB 54 is connected to the PLB 46 through a PLB/OPB bridge device 56. The bridge device 56 can translate 32 bit data to 64 bit data and vice versa. Various peripheral devices can communicate with the OPB 54. By way of non-limiting examples, a touch panel interface 58 can be connected to the OPB 54. Also, other storage interfaces 60 can be connected to the OPB 54. Further non-limiting examples of peripheral devices that can be connected to the OPB 54 include a USB, a UART, an interrupt (UC), and an AC97 device.

In accordance with the present invention, the communication processor 18 can also communicate with the PLB 46 over its memory interface 24. Specifically, as shown in FIG. 2, in one exemplary embodiment the memory interface 24 of the communication processor 18 is connected to the PLB 46 by a PLB bridge processor 62. In one implementation, the PLB bridge processor 62 is implemented in hardware by a logic device, such as, e.g., a processor. In this way, the communication processor 18 can access the devices connected to the PLB 46. If desired, the functions of the PLB bridge processor 62 can be implemented by, e.g., a dedicated portion of the communication processor 18.

Figure 3:
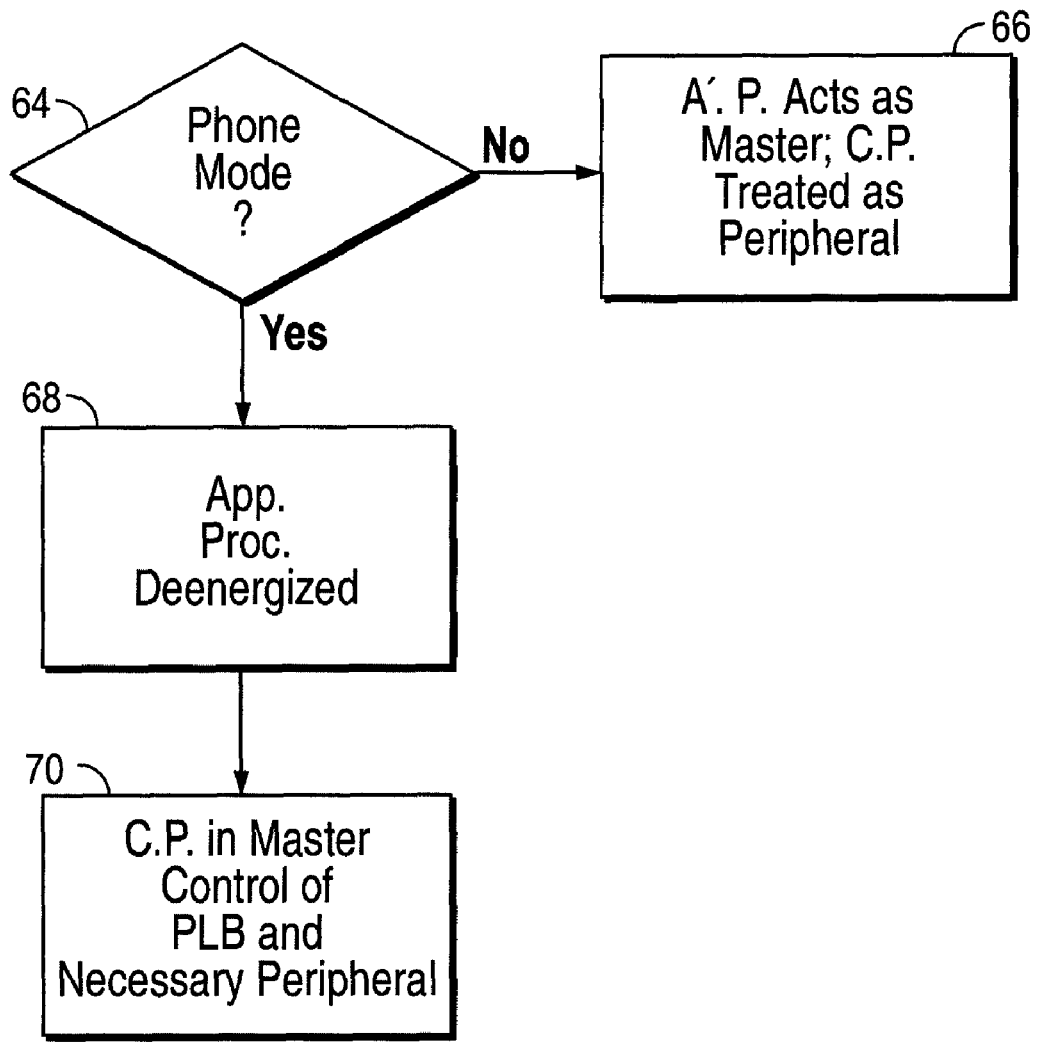
FIG. 3 is a flow chart illustrating the logic of the invention.

FIG. 3 shows the logic that is executed by the PLB bridge processor 62 to negotiate which processor 18, 36 controls the peripherals shown in FIG. 2. At decision diamond 64 it is determined whether the device 10 is in the communication mode as indicated by, e.g., the mode selector 16 or other user activity discussed above. If not, meaning that the device 10 is in the computing mode, the logic flows to block 66, wherein the PLB bridge processor 62 designates the application processor core 36 to be the master processor in control of the PLB 46 and OPB 54. In this mode, the communication processor 18 can be treated by the application processor core 36 as a peripheral device.

On the other hand, if the device 10 is in the communication mode, the logic moves from decision diamond 64 to block 68, wherein at least the application processor core 36 of the application processor 34 is deenergized. That is, in the communication mode, according to present principles the application processor core 36 is deenergized. Consequently, the communication processor 18 is assigned (by, e.g., the PLB bridge processor 62) the role of master processor at block 70, controlling the peripheral devices connected to the PLB 46 and OPB 54.

While the particular LOW POWER DUAL PROCESSOR ARCHITECTURE FOR MULTI MODE DEVICES as herein shown and described in detail is fully capable of attaining the above-described objects of the invention, it is to be understood that it is the presently preferred embodiment of the present invention and is thus representative of the subject matter which is broadly contemplated by the present invention, that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more". All structural and functional equivalents to the elements of the above-described preferred embodiment that are known or later come to be known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. '112, sixth paragraph, unless the element is expressly recited using the phrase "means for" or, in the case of a method claim, the element is recited as a "step" instead of an "act".

What is claimed is:

1. A multi mode mobile device configured to operate in a computing mode or a communication mode, comprising:
    a battery;
    an application processor configured to execute at least one application in the computing mode, the application processor being powered at least in part by the battery;
    a communication processor configured to facilitate wireless communication in the communication mode, the communication processor being powered at least in part by the battery;
    a processor local bus (PLB) bridge processor configured to enable the communication processor to function as a master processor when the multi mode mobile device is in the communication mode and to enable the communication processor to function as a peripheral processor when the multi mode mobile device is in the computing mode;
    wherein the application processor functions as a master processor and the communication processor functions as the peripheral processor when the multi mode mobile device is in the computing mode;
    wherein the communication processor functions as the master processor and the application processor functions as the peripheral processor when the multi mode mobile device is in the communication mode;
    wherein the master processor controls the peripheral processor; and
    wherein the application processor is associated with a PLB.

2. The multi mode mobile device of claim 1, wherein the communication processor is associated with a memory bus communicating with one or more memory devices, and wherein the PLB bridge processor is configured to bridge the memory bus to the PLB.

3. The multi mode mobile device of claim 2, further comprising at least one peripheral hardware component connected to the PLB.

4. The multi mode mobile device of claim 3, wherein the communication processor is further configured to accesses the at least one peripheral hardware component when the multi mode mobile device is in the communication mode.

5. The multi mode mobile device of claim 3, wherein the at least one peripheral hardware component includes at least one of a touch panel controller and a storage interface.

6. A method of operating a multi mode mobile device having a computing mode and a communication mode, comprising:
    powering an application processor and a communication processor at least in part by a battery;
    executing at least one application with the application processor when the multi mode mobile device is in the computing mode, wherein the application processor functions as a master processor and the communication processor functions as a peripheral processor when the multi mode mobile device is in the computing mode, wherein the communication processor functions as the master processor and the application processor functions as the peripheral processor when the multi mode mobile device is in the communication mode, wherein the master processor controls the peripheral processor;
    facilitating wireless communication with the communication processor when the multi mode mobile device is in the communication mode; and
    using a processor local bus (PLB) bridge processor to enable the communication processor to function as the master processor and the communication processor to function as the peripheral processor when the multi mode mobile device is in the computing mode;
    wherein the application processor is associated with a PLB.

7. The method of claim 6, wherein the communication processor is associated with a memory bus communicating with one or more memory devices, the method further comprising using the PLB bridge processor to bridge the memory bus to the PLB.

8. The method of claim 7, further comprising at least one peripheral hardware component connected to the PLB.

9. The method of claim 8, further comprising using the communication processor to access the at least one peripheral hardware component when the multi mode mobile device is in the communication mode.

10. The method of claim 8, wherein the at least one peripheral hardware component includes at least one of a touch panel controller and a storage interface.

11. A multi mode mobile device configured to operate in a computing mode or a communication mode, comprising:
a battery;
application processing means for executing at least one application when the multi mode mobile device is in the computing mode, the application processing means being powered at least in part by the battery;
communication processing means for facilitating wireless communication when the multi mode mobile device is in the communication mode, the communication processing means being powered at least in part by the battery;
a processor local bus (PLB) bridge processing means for enabling the communication processing means to function as the master processor and the communication processing means to function as a peripheral processor when the multi mode mobile device is in the computing mode;
wherein the application processing means functions as a master processor and the communication processing means functions as a peripheral processor when the multi mode mobile device is in the computing mode;
wherein the communication processing means functions as the master processor and the application processing means functions as the peripheral processor when the multi mode mobile device is in the communication mode;
wherein the master processor controls the peripheral processor; and
wherein the application processing means is associated with a PLB.

12. The multi mode mobile device of claim 11, wherein the communication processing means is associated with a memory bus communicating with one or more memory devices, and wherein the PLB bridge processing means comprises means for bridging the memory bus to the PLB.

13. The multi mode mobile device of claim 12, further comprising at least one peripheral hardware component connected to the PLB.

14. The multi mode mobile device of claim 13, wherein the communication processing means comprises means for accessing the at least one peripheral hardware component when the multi mode mobile device is in the communication mode.

15. The multi mode mobile device of claim 13, wherein the at least one peripheral hardware component includes at least one of a touch panel controller and a storage interface.

16. A multi mode mobile device configured to operate in a computing mode or a communication mode, the device comprising:
an application processor configured to execute at least one application in the computing mode;
a communication processor configured to facilitate wireless communication in the communication mode; and
a bridge processor configured to enable the communication processor to control the application processor when the multi mode mobile device is in the communication mode and to enable the application processor to control the communication processor when the multi mode mobile device is in the computing mode.

* * * * *